(12) United States Patent
Kajita et al.

(10) Patent No.: US 6,316,900 B2
(45) Date of Patent: *Nov. 13, 2001

(54) SINGLE SHAFT TYPE TABLE FEED DEVICE

(75) Inventors: Toshiharu Kajita; Hiroshi Fujita, both of Maebashi (JP)

(73) Assignee: NSK, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/741,491

(22) Filed: Dec. 19, 2000

Related U.S. Application Data

(63) Continuation of application No. 09/239,213, filed on Jan. 28, 1999, now Pat. No. 6,191,548.

(30) Foreign Application Priority Data

Jan. 29, 1998 (JP) ...................................................... 10-17454

(51) Int. Cl.[7] ................................ G05B 1/06; F16H 25/00
(52) U.S. Cl. ...................... 318/568.18; 318/57; 318/595; 74/89.15
(58) Field of Search ..................................... 318/560–696; 29/741, 739, 809, 827, 566.3; 74/89.15, 17.8, 459, 566, 424.8 R, 89.22

(56) References Cited

U.S. PATENT DOCUMENTS

| | | | |
|---|---|---|---|
| 4,704,792 | 11/1987 | Itagaki et al. | 29/741 |
| 5,074,160 | 12/1991 | Kasuga | 74/89.15 |
| 5,251,501 | 10/1993 | Katahira | 74/89.15 |
| 5,271,146 | 12/1993 | Kashiwagi | 29/566.3 |
| 5,311,788 | 5/1994 | Kasuga | 74/89.15 |
| 5,370,214 | 12/1994 | Katahira | 198/345.1 |
| 5,559,413 | 9/1996 | Seto | 318/568.18 |
| 5,761,960 | 6/1998 | Nagai et al. | 74/89.15 |
| 5,811,901 | 9/1998 | Nagai et al. | 310/80 |
| 6,191,548 | * 2/2001 | Kajitav . | |

* cited by examiner

Primary Examiner—Paul Ip
(74) Attorney, Agent, or Firm—Marshall, Gerstein, & Borun

(57) ABSTRACT

A single shaft type table feed device comprises a movable body and an auxiliary movable body 34. The movable body is supported by a guide rail 31 and can be freely moved by a feed screw shaft 35 in the axial direction thereof. The auxiliary movable body 34 includes an inside diameter portion through which the feed screw shaft 35 can be inserted. The auxiliary movable body 34 is supported by the guide rail 31 and freely movable in the axial direction thereof. The inside diameter portion 38a of the auxiliary movable body 34 is slidingly contacted with the feed screw shaft 35.

16 Claims, 7 Drawing Sheets

SINGLE SHAFT TYPE TABLE FEED DEVICE

This is a continuation of U.S. patent application Ser. No. 09/239,213, filed Jan. 28, 1999 now U.S. Pat. No. 6,191,548.

BACKGROUND OF THE INVENTION

The present invention relates to a single shaft type table feed device including a movable body and an auxiliary movable body and, in particular, to a single shaft type table feed device in which the auxiliary movable body can fill a role of the part of an intermediate support, to thereby be able to enhance the critical speed of a feed screw shaft.

Conventionally, as a table feed device using a feed screw shaft, there are known various types of table feed devices. One of them is a single shaft type table feed device which is a feed screw integrally combined linear guide device obtained by combining a feed screw device with a linear guide device into an integrally united body.

In particular, a single shaft type table feed device to be improved by the invention is a single shaft type table feed device in which there are mounted not only a movable body including a screw nut portion engageable with the feed screw shaft but also an auxiliary movable body not including a screw nut portion so as to enhance the resistance of the feed screw shaft to a load applied thereto.

Recently, there has been increasing a demand for enhancing the feed speed of the single shaft type table feed device of this kind.

By the way, in the table feed device using a feed screw shaft, if the number of working rotations of the feed screw shaft approaches the natural frequency of the feed screw shaft, then it becomes a so called critical speed, thereby producing resonance. Since the critical speed is in inverse proportion to the square of the support distance of the feed screw shaft, if the support distance is set as short as possible to thereby enhance the natural frequency of the feed screw shaft, then the critical speed of the feed screw shaft can be increased effectively. Therefore, in a feed screw shaft having a long length, generally, as shown in FIG. 7, an intermediate support 2 in sliding engagement with the feed screw shaft 1 is set at an intermediate position in the support distance of the feed screw shaft on a base member. In this case, in order to prevent interference between the intermediate support 2 and a nut 4 which is in threadedly engagement with the feed screw shaft 1 and is mounted on a table 3, there is provided a limit switch 5; that is, when the table 3 passes, the intermediate support 2 can be retreated in accordance with the limit switch 5.

Also, in the Japanese Patent No. 2526816, there is disclosed another example of the intermediate support. In this intermediate support, as shown in FIG. 8, two guide rails 7 are fixed to two side portions of a base member in parallel to each other, a pair of table linear motion bearings (that is, table sliders) 8 are fitted on each of the two guide rails 7 in such a manner that they can be freely moved in the axial direction of the guide rails, and a table 3 is fixed to each of the table sliders 8 on the top surfaces thereof. A feed screw shaft 1 is interposed between and extended in parallel to the two guide rails; in particular, one end side of the feed screw shaft 1, which is to be connected with a drive motor 13, is supported by a support unit 11, whereas the opposite end side thereof is supported by a support bearing 12. An intermediate support 14 is interposed between the support bearing 12 and a table nut 4 which is threadedly engaged with the feed screw shaft 1 through balls. Also, the intermediate support 14 includes an intermediate support frame 16 which is supported by intermediate support linear motion bearings (that is, intermediate support sliders) 15, 15 respectively fitted with the guide rails 7, 7, and an intermediate support nut 17 which is threadedly engaged with the feed screw shaft 1 through balls and is supported in such a manner that it is prevented from moving in the axial direction with respect to the intermediate support frame 16 but can be rotated freely. On the other hand, between the feed screw shaft 1 and one guide rail 7, there is disposed an auxiliary feed screw device 20 which comprises an auxiliary feed screw 18 having an axis parallel to the feed screw shaft 1 and supported on the base member, and an intermediate support feed nut 19 which is threadedly engaged with the present auxiliary feed screw 18. And, the intermediate support feed nut 19 is fixed to and mounted on the intermediate support frame 16 of the intermediate support 14. Also, the end portion of the auxiliary feed screw 18 having a uniform pitch and the end portion of the feed screw shafts 1 are connected together by auxiliary feed screw drive means 21 which comprise a timing belt and a timing pulley in such a manner that the auxiliary feed screw 18 can be rotated at one half of the number of rotations of the feed screw shaft 1. With use of the intermediate support 14, if the feed screw shaft 1 is driven or rotated by the drive motor 13, then the table nut 4 is moved and, in linking with the movement of the table nut 4, the intermediate support 14 is moved in the same direction by an amount of one half of the moving amount of the table nut 4. Due to this, the intermediate support 14 is always allowed to support the feed screw shaft 1 almost centrally between the table nut 4 and support bearing 12, thereby being able to enhance the critical speed of the feed screw shaft 1.

Conventionally, a single shaft type table feed device including an auxiliary movable body increases a span between the nut portion of the movable body and the supporting shaft, because the auxiliary movable body having an unloaded hole which is not engaged with the feed screw shaft is interposed between a movable body including a nut portion to be threadedly engaged with a feed screw shaft and a bearing for supporting the end portion of the feed screw shaft.

As a result, the natural frequency of the feed screw shaft is lowered, that is, the critical speed is lowered, thereby often raising a problem that the use of the single shaft type table feed device at the high speed feed is limited. As a measure to deal with this problem, there can be provided an intermediate support in the single shaft type table feed device.

However, in the conventional intermediate support 2 shown in FIG. 7, there is found a drawback as follows: that is, it is necessary to provide a retreat mechanism which is capable of retreating the intermediate support 2 when the table 3 or table nut 4 passes through the intermediate support 2. In fact, the retreat mechanism is complicated in structure and, therefore, it is not proper from viewpoints of not only cost but also space to use the conventional intermediate support 2 including such complicated retreat mechanism as an intermediate support of a single shaft type table feed device inherently having a compact structure.

On the other hand, in the conventional intermediate support 14 shown in FIG. 8 as well, there is also found a drawback as follows: that is, it is necessary to provide the auxiliary feed screw device 20 which is capable of moving the intermediate support 14 in linking with the table nut 4, but the auxiliary feed screw device 20 is complicated in structure. Therefore, similarly to the intermediate support 2, it is not proper to use the conventional intermediate support 14 as an intermediate support of a compact single shaft type table feed device from viewpoints of cost and space.

SUMMARY OF THE INVENTION

In view of the above circumstances of the prior art, the present inventors have studied how to increase the speed of the single shaft table feed device which includes the movable body and auxiliary movable body and is easy to incur the lowered critical speed, and have finally found a unique fact that, if the auxiliary movable body conventionally formed in such a manner as not to be engaged with the feed screw shaft can fill the role as an intermediate support, then the critical speed of the feed screw shaft can be increased.

Accordingly, it is an object of the invention to provide a single shaft type table feed device which is capable of increasing the critical speed of the feed screw shaft and thus realizing a high speed feed operation at a low cost and in a compact structure.

In attaining the above object, according to the invention, there is provided a single shaft type table feed device which comprises:

a single feed screw shaft extending in an axial direction;

a guide rail extending in parallel with the screw shaft;

a movable body movably supported by the guide rail and fed by the screw shaft in the axial direction: and an auxiliary movable body disposed apart from the movable body in the axial direction for supporting the table, the auxiliary movable body movably supported by the guide rail in the axial direction and moved in linking with a movement of a table mounted on the movable body.

In the above-mentioned single shaft type table feed device, it is preferable that the auxiliary movable body includes an inside diameter portion through which the feed screw shaft can be inserted, and the inside diameter portion of the auxiliary movable body is contactable with the said feed screw shaft.

In the above-mentioned single shaft type table feed device, it is preferable that the inside diameter portion of the auxiliary movable body is disengaged with said feed screw shaft in a normal operation, but is contacted with the same when the feed screw shaft is vibrated.

In the above-mentioned single shaft type table feed device, it is advantageous that the inside diameter portion of the auxiliary movable body is slidably contacted with the feed screw shaft.

Here, to bring the auxiliary movable body into sliding contact with the feed screw shaft, a sliding contact member to be ligthly contactable with the feed screw shaft may be inserted into the inside diameter portion of the auxiliary movable body.

The sliding contact member may be preferably formed in a cylindrical shape. In addition to this, it is preferable that in order to facilitate the mounting of the sliding contact member, the cylindrical shape of the sliding contact member may also be divided in the peripheral direction thereof and then may be fastened by an elastic body, such as garter spring or the like.

Further, the cylindrical shape of the sliding contact member may also be divided in the axial direction thereof and may be then mounted onto the inside diameter portion of the auxiliary movable body.

Furthermore, the sliding contact member may comprise a lubricant containing member.

Moreover, the auxiliary movable body may be brought in threadedly engagement with the feed screw shaft.

Furthermore, the sliding contact member may be mounted spirally on the inside diameter portion of the auxiliary movable body. In this case, the spirally winding direction of the sliding contact member may be matched to the screw shape of the screw groove of the feed screw shaft and thus the sliding contact member may be threadedly engaged with the feed screw shaft.

Moreover, a sliding contact member with a screw may be structured such that it can be rotated on the auxiliary movable body. In this case, since the auxiliary movable body can be fixed at an arbitrary position in the axial direction of the feed screw shaft, the support distance necessary for an intermediate support can be decided arbitrarily and thus the critical speed of the feed screw shaft can be adjusted properly.

As material suitable for the sliding contact member, there can be used fluorine resin having a good sliding property; a crystalline polymer such as nylon, POM, PBT, PET, PPS, PEEK, or the like; a polymer alloy (a multi-component system containing two or more kinds of polymers); a composite plastics containing reinforcing fibers or the like; and, other similar material. Also, it is also possible to use material having a lubricating property, for example, lubricant containing resin, a solid lubricant such as molybdenum sulfide or the like. In this case, not only the critical speed of the feed screw shaft can be enhanced but also the lubrication of the feed screw can be carried out.

Further, as means for fixing the sliding contact member to the inside diameter portion of the auxiliary movable body, there can be used a fixing screw which is capable of fastening the auxiliary movable body from outside. Also, as in an embodiment to be discussed later herein, it is also possible to use end caps which are respectively mounted on the two end portions of the auxiliary movable body in the axial direction thereof.

Note that, in the present invention, the term "the inside diameter portion of an auxiliary movable body" on which the sliding contact member is to be mounted means not only the inside diameter portion of the main body of the auxiliary movable body (for example, a sub-slider main body) but also the inside diameter portion of an attachment to be mounted on the main body of the auxiliary movable body (for example, the inside diameter portions of the end caps to be mounted on the two end portions of the sub-slider main body). Therefore, the invention also implies that the sliding contact member is mounted on the inside diameter portion of an attachment of an auxiliary movable body to thereby bring the sliding contact member into sliding contact with the feed screw shaft.

Also, according to the invention, even if the inside diameter portion of the auxiliary movable body is not slidingly contacted with the feed screw shaft, by setting a clearance between the inside diameter portion of the auxiliary movable body and the outside diameter surface of the feed screw shaft in such a manner as to have a size which allows the former to be contacted with the latter when the latter, namely, the feed screw shaft is vibrated, the auxiliary movable body can fill the roleas an intermediate support.

DETAILED DESCRIPTION OF THE PREFERRED EMBODIMENTS

Now, description will be given below of the preferred embodiments of a single shaft type table feed device according to the invention with reference to the accompanying drawings.

<Embodiment 1>

Firstly, description will be given below of a first embodiment of a single shaft type table feed device according to the invention with reference to FIGS. 1 to 4.

Figure 1:
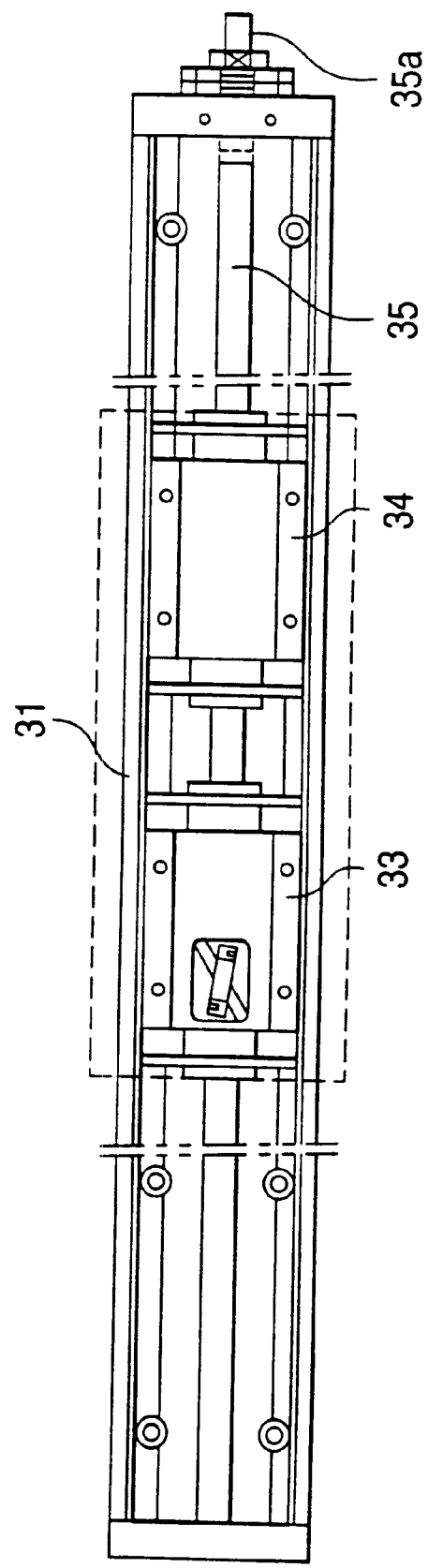
FIG. 1 is a plan view of the whole of a first embodiment of a single shaft type table feed device according to the invention.
Figure 2:
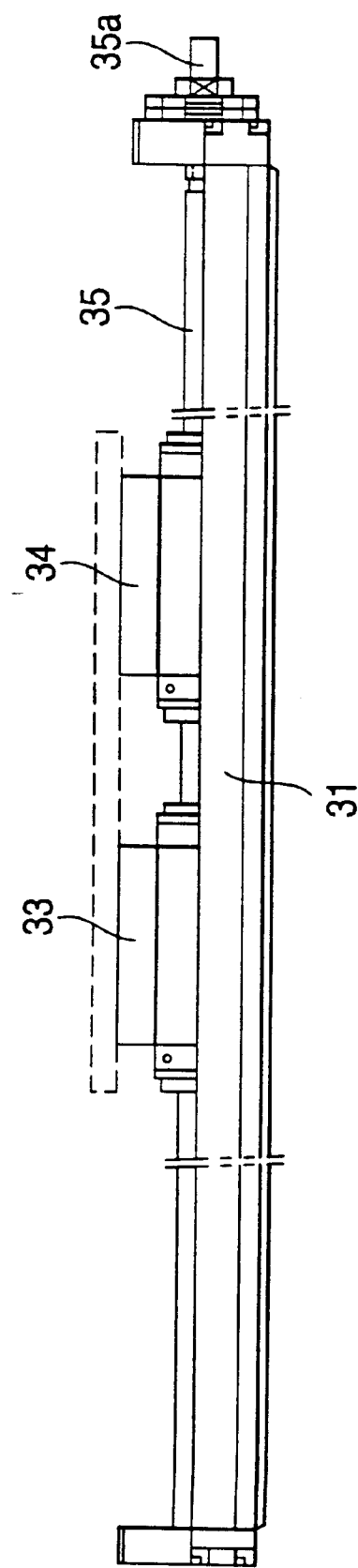
FIG. 2 is a side view of the whole of the first embodiment.
Figure 3:
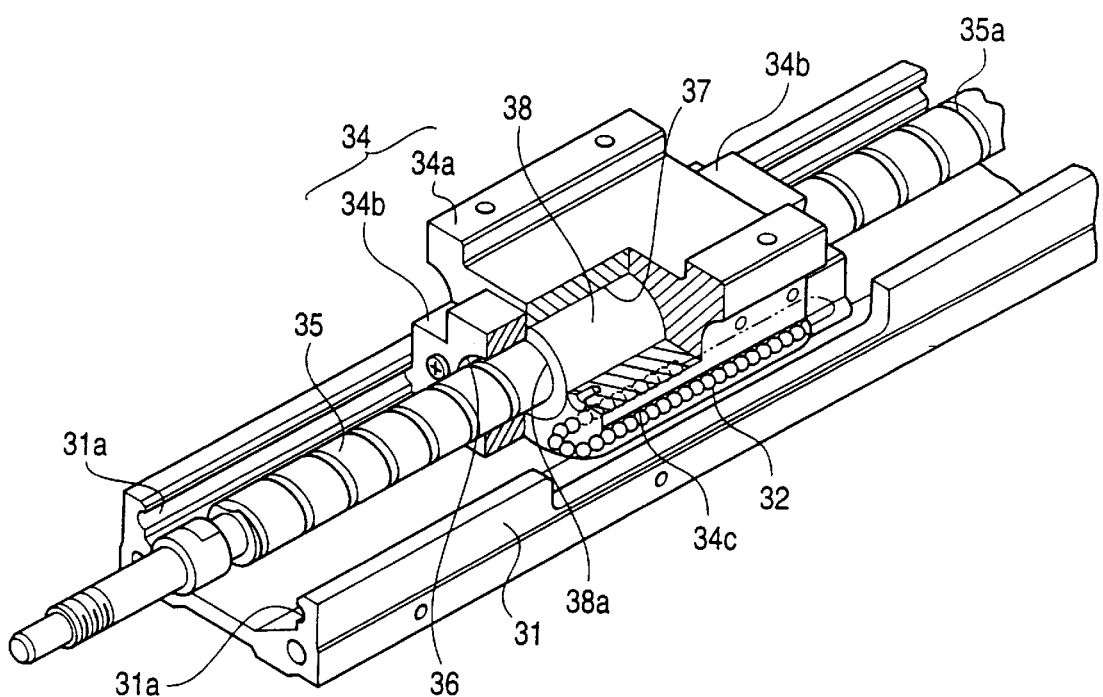
FIG. 3 is a partially cutaway perspective view of the first embodiment, showing the structure of an auxiliary movable body employed in the first embodiment.
Figure 4:
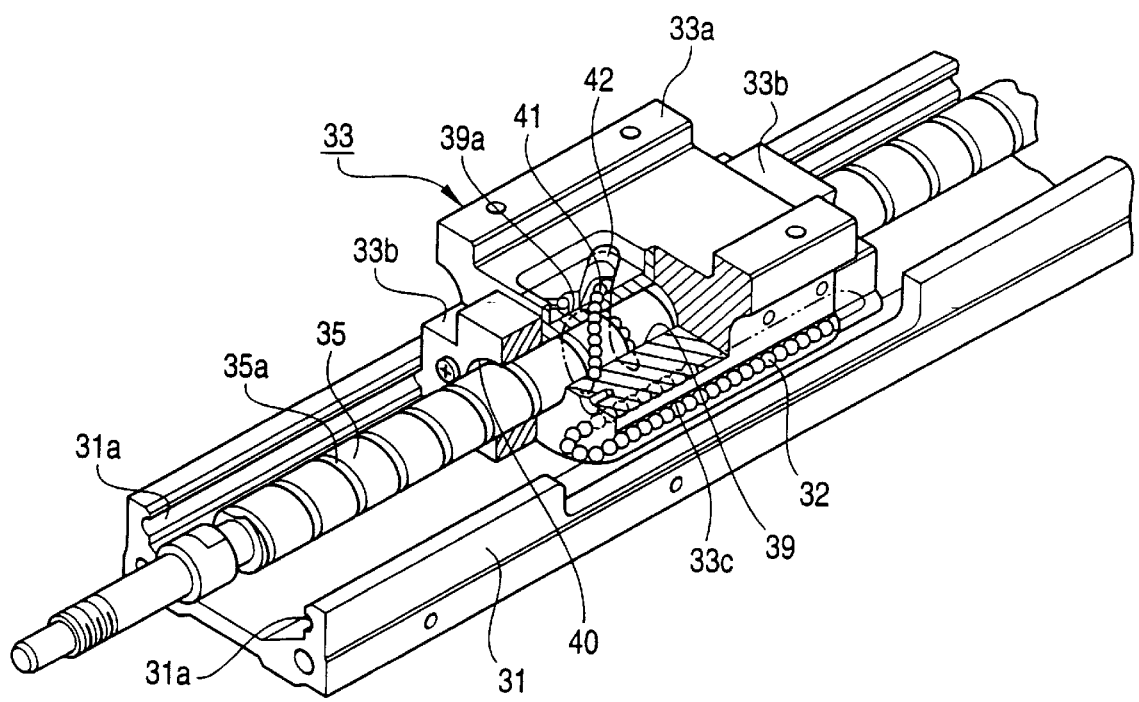
FIG. 4 is a partially cutaway perspective view of the first embodiment, showing the structure of a movable body employed in the first embodiment.

Now, FIGS. 1 to 4 respectively show the structure of a first embodiment of a single shaft type table feed device according to the invention. In particular, FIG. 1 is a plan view of the whole of the single shaft type table feed device. FIG. 2 is a side view thereof. FIG. 3 is a perspective view of thereof, in which the structure of an auxiliary movable body employed in the single shaft type table feed device is shown in a partially cutaway manner. FIG. 4 is a perspective view of thereof, in which the structure of a movable body employed in the single shaft type table feed device is shown in a partially cutaway manner.

As can be seen clearly from these figures, the present single shaft type table feed device comprises a guide rail 31, a slider 33, a sub-slider 34 and a ball shaft 35. The guide rail 31 has a substantially U-shaped cross section, includes two ball rolling grooves 31a respectively formed in the two opposed inner surfaces thereof, and is extended in the axial direction thereof. The slider 33 serves as a movable body which is fitted with the guide rail 31 in such a manner as to be freely movable in the axial direction thereof. The sub-slider 34 serves as an auxiliary movable body. A ball shaft 35 serves as a feed screw shaft which is extended along the axis of the guide rail 31 and the two ends of which are supported rotatably through bearings (not shown).

One shaft end portion 35a of the ball screw shaft 35 is projected outwardly of the guide rail 31 and can be connected with the output shaft of a drive motor (not shown).

The slider 33 and sub-slider 34 respectively comprise main bodies 33a and 34a, and end caps 33b and 34b are removably mounted on their respective two end portions of main bodies 33a and 34a, respectively. And, on the respective two side surfaces of the main bodies 33a and 34a, there are respectively formed ball rolling grooves 33c and 34c which are respectively opposed to the ball rolling grooves 31a of the guide rail 31. Between the ball rolling grooves 31a of the guide rail 31 and the ball rolling grooves 33c and 34c opposed to the ball rolling grooves 31a, there are interposed a large number of linear motion guiding balls 32. Also, in the end caps 33b and 34b on the two front and rear end faces of the respective main bodes 33a and 34a, there are formed circulation passages which are used to cause the balls 32 to make a U-turn so that the balls 32 can be made to circulate in an endless manner. Due to the rolling motion of the balls 32, the slider 33 and sub-slider 34, while sharing the load given from a table (not shown) mounted on their respective upper surfaces by screws, can be moved smoothly in the axial direction of the guide rail 31 under the guide of the guide rail 31.

The ball screw shaft 35 is inserted through the core of the sub-slider 34. Therefore, in the slider main body 34a, there is formed a cylindrical-shaped screw shaft insertion hole 37 in a so called "unloaded hole" manner. Also, in each of the end caps 34b and 34b mounted on the two end portions of the sub-slider 34, there is formed in a unloaded hole manner a screw shaft insertion hole 36 slightly smaller in diameter than the screw shaft insertion hole 37. On the inside diameter surface of the insertion hole 37 of the sub-slider main body 34a, as shown in FIG. 3, there is mounted a cylindrical-shaped sliding contact member 38, for example, by inserting the same with pressure, or by other similar means and the sliding contact member 38 is restricted in the axial direction thereof by the end caps 34b respectively mounted on the two end portions of the sub-slider 34, The sliding contact member 38 is structured such that the inside diameter portion 38a thereof is in sliding contact with the outer peripheral surface of the ball screw shaft 35. The reason for use of this sliding contact is to give the sub-slider 34, which is originally provided so as to enhance the resistance-to-load of the ball screw shaft, the function of an intermediate support for supporting the intermediate portion of the ball screw shaft 35; that is, the sliding contact member 38 may have only the size which is capable of supporting the ball screw shaft 35. Therefore, the sliding contact member 38 must not be always slidingly contacted with the whole circumference of the ball screw shaft 35; but, for example, it is also possible to employ a partial sliding contact structure in which the cylindrical shape of the sliding contact member 38 may be opened in part in the axial direction thereof and is thereafter mounted on the ball screw shaft 35, so that the sliding contact member 38 is slidingly contacted with the circumference of the ball screw shaft 35 in such a manner it is not slidingly contacted with some part of the circumference of the ball screw shaft 35.

In the single shaft type table feed device according to the invention, preferably, the sliding contact member 38 may be moved in linking with the movement of the table while in sliding contact with the ball screw shaft 35. For this reason, the sliding contact member 36 is formed of material having a good sliding motion property such as fluorine resin or the like. However, as the material of the sliding contact member 38, besides the fluorine resin, there can also be used a crystalline polymer such as nylon, POM, PBT, PET, PPS, PEEK or the like; a polymer alloy; composite plastics consisting of plastics to which reinforcing fibers or the like are added according to cases; and, the like. Further, when there is used a sliding contact member 38 formed of lubricant containing resin which is a mixture of lubricating oil and synthetic resin, the lubricant of the resin oozes out from the sliding contact member 38 over a long period of time and is supplied to the ball screw shaft 35, so that not only the critical speed of the ball screw shaft 35 can be enhanced but also the automatic lubrication of the ball screw shaft 35 is possible.

The structure of the slider 33 may be similar to the ball screw nut employed in the conventional single shaft type table feed device. That is, as shown in FIG. 4, in the axially central portion of the slider main body 33a, there is formed an insertion hole 39 through which the ball screw shaft 35 can be inserted and, in the inner peripheral surface of the insertion hole 39, there is formed a spiral-shaped ball screw groove 39a in such a manner as to correspond to the ball screw groove 35a of the ball screw shaft 35. Also, there are formed screw shaft insertion holes 40 respectively in the end caps 33b and 33b which are fixed to the two end portions of the slider main body 33a by bolts. In the upper portion of the slider main body 33a, there is incorporated a U-shaped ball circulating tube 42 serving as a ball-screw-system ball circulating passage which is used to guide and circulate ball screw balls 41 respectively rolling within the ball screw groove 35a of the ball screw shaft 35 and the ball screw groove 39a formed in the slider main body inside diameter surface and opposed to the ball screw groove 35a. The balls 41 are arranged in a known tube type circulation structure in which the balls 41 are picked up from the ball screw groove 35a into the ball circulating tube 42, are moved along the present tube 42 to climb over the land portion of the ball screw shaft 35, and return again to the ball screw groove 35a, so that they are circulated in an endless manner. By the way, the structure of the ball-screw-system ball circulating passage of the slider 33 serving as the movable body in the single shaft type table feed device according to the invention is not limited to the above-mentioned tube type circulating structure but there can be used other types of known ball circulating passage structures, for example, a circulating frame type of ball circulating passage structure, an end cap type of ball circulating passage structure, and the like.

Now, in the single shaft type table feed device structured in the above-mentioned manner, a common table is previously mounted on the upper surfaces of the slider 33 and sub-slider 34. In this state, if the ball screw shaft 35 is driven or rotated, then the slider 33 is allowed to act as a ball screw nut, that is, the slider 33 starts to move in the axial direction thereof in compliance with the rotation of the ball screw shaft 35. And, since the sub-slider 34 is connected with the slider 33 through the table, the sub-slider 34 moves similarly to the slider 33 in linking with the movement of the slider 33. The sub-slider 34 moves while sharing the load applied to the table with the slider 33. At the same time, the sub-slider 34 is slidingly contacted with the ball screw shaft 35 through the sliding contact member 38 mounted on the inside diameter surface of the sub-slider 34 to support the same, thereby performing the function of an intermediate support. That is, in the conventional single shaft type table feed device, because an intermediate support cannot be installed between the slider 33 and the bearing for supporting the end portion of the ball screw shaft 35, the support distance of the ball screw shaft 35 becomes long and thus the critical speed of the ball screw shaft 35 is restricted to a low speed level, which makes it difficult to increase the feeding speed of the slider 33. On the other hand, according to the present embodiment of the invention, since the sub-slider 34 itself provides an intermediate support, the support distance of the ball screw shaft 35 can be reduced to thereby be able to enhance the critical speed of the ball screw shaft 35. As a result, the high feeding speed of the single shaft type table feed device can be realized easily.

<Embodiment 2>

Now, description will be given below of a second embodiment of a single shaft type table feed device according to the invention with reference to FIG. 5.

Figure 5:
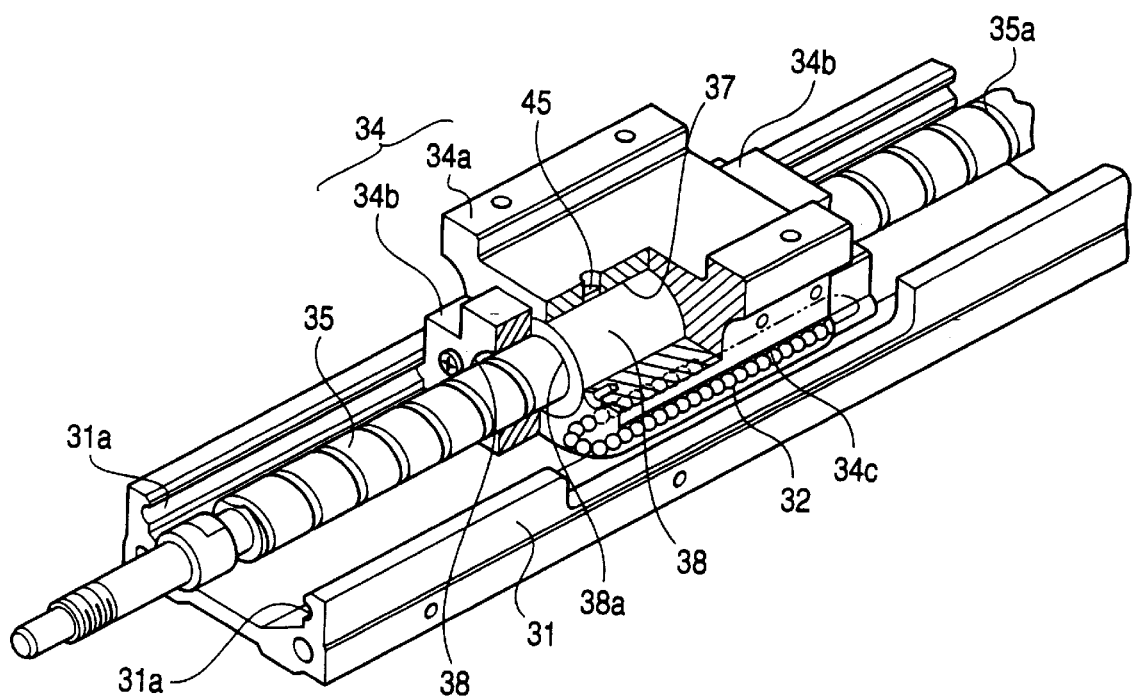
FIG. 5 is a partially cutaway perspective view of a second embodiment of a single shaft type table feed device according to the invention, showing the structure of an auxiliary movable body employed in the second embodiment.

Here, FIG. 5 is a perspective view of a sub-slider 34 employed in the second embodiment of a single shaft type table feed device according to the invention.

The present sub-slider 34 is different from that of the previously described first embodiment in that a fixing screw 45 is used a the fixing means for fixing the sliding contact member 38. According to this fixing means, there is eliminated the need to restrict the movement of the sliding contact member 38 in the axial direction thereof by the end caps 34b, and it is not necessary to match the whole length of the sliding contact member 38 to the length of the sub-slider main body 34a. Therefore, according to the second embodiment, there can be provided an advantage that a slidingly contact member 38 of a shorter length can be used. The remaining operations and effects of the second embodiment are similar to those of the first embodiment.

<Embodiment 3>

Figure 6:
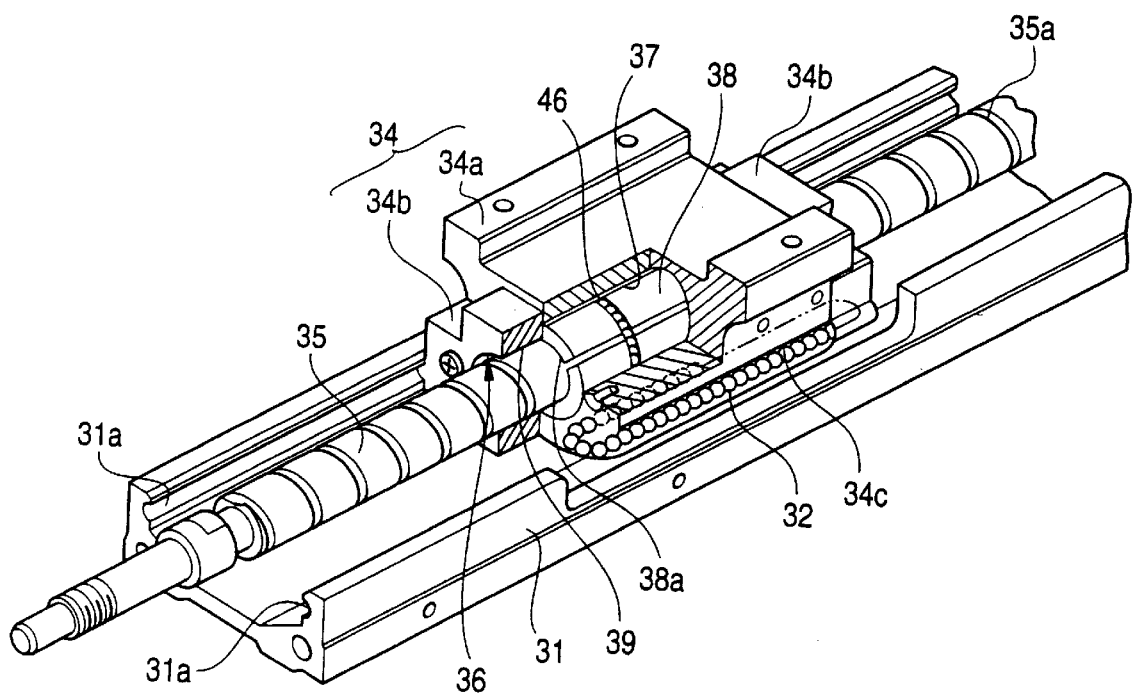
FIG. 6 is a partially cutaway perspective view of a third embodiment of a single shaft type table feed device according to the invention, showing the structure of an auxiliary movable body employed in the third embodiment.
Figure 7:
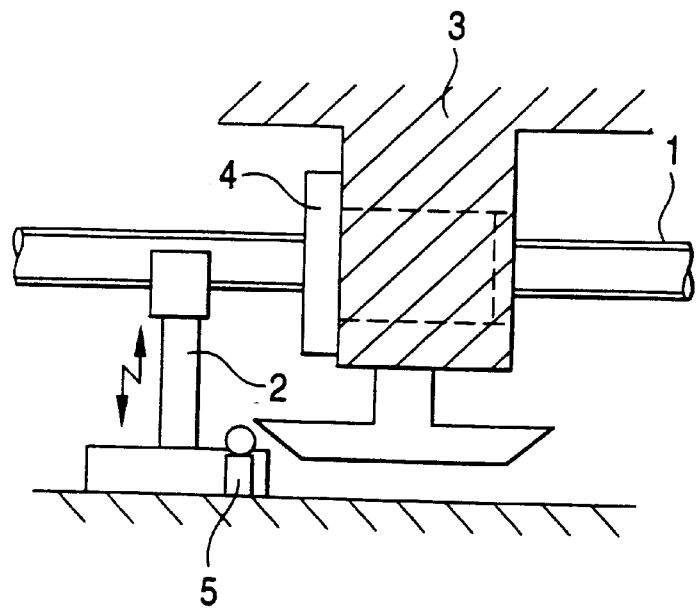
FIG. 7 is a schematic view of an example of a conventional intermediate support.
Figure 8:
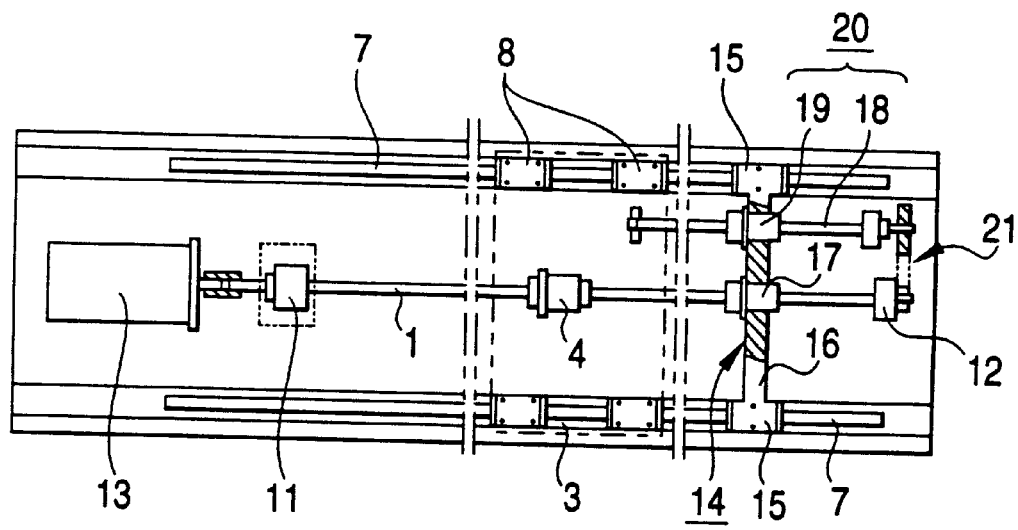
FIG. 8 is a schematic view of another example of a conventional intermediate support.

Now, FIG. 6 is a perspective view of a sub-slider 34 employed in a third embodiment of a single shaft type table feed device according to the invention.

The present sub-slider 34 is different from those of the previously described first and second embodiments in that a cylindrical-shaped sliding contact member 38 is divided in the peripheral direction thereof into a plurality of divisional sections, the divisional sections of the sliding contact member 38 are arranged in such a manner as to surround the outer periphery of the ball screw shaft 35, are fastened by an elastic body 46 such as a garter spring or the like, and are mounted on the inside diameter surface of the screw shaft insertion hole 37 of the sub-slider main body 34a. The third embodiment is advantageous in that the mounting of the cylindrical-shaped sliding contact member 38 can be achieved more easily than when it is inserted by pressure into the screw shaft insertion hole 37. Also, when the sliding contact member is formed of material containing a lubricant therein, there can be provided an advantage that, due to the action of the elastic body, the inside diameter surface of the sliding contact member is pressed against the outside diameter surface of the ball screw shaft to thereby be able to supply the lubricant to the ball screw shaft effectively. The remaining operations and effects of the third embodiment are similar to those of the first embodiment.

By the way, in the above-mentioned respective embodiments, there has been illustrated an arrangement in which the sliding contact member 38 is mounted on the inside diameter surface of the screw shaft insertion hole 37 of the sub-slider main body 34a. However, the mounting portion of the sliding contact member 38 according to the invention is not limited to this arrangement. For example, the sliding contact member 38 may be mounted on the inside diameter surface(s) of one or both of the end caps 34b respectively mounted on the front and rear end portions of the sub-slider main body 34a, provided that the resistance-to-load of the single shaft type table feed device is not degraded.

In the above-mentioned respective embodiments, there has been illustrated an example in which the inside diameter of the auxiliary movable body is slidingly contacted with the outside diameter surface of the feed screw shaft. However, even if the auxiliary movable body is not slidingly contacted with the outside diameter surface of the feed screw shaft, the auxiliary movable body can be made to play the part of an intermediate support. That is, if a clearance between the inside diameter of the auxiliary movable body and the outside diameter surface of the feed screw shaft is set in such a manner as to have a size which, when the feed screw shaft is vibrated, allows the outside diameter surface of the feed screw shaft to be contacted with the inside diameter portion of the auxiliary movable body, then the resonance of the feed screw shaft can be prevented, that is, the auxiliary movable body can be made to play the part of an intermediate support.

As has been described heretofore, with use of a single shaft type table feed device according to the invention, by arranging the auxiliary movable body in such a manner as to be able to play the part of an intermediate support, the critical speed of the feed screw shaft can be enhanced and thus the increased feeding speed of the single shaft type table feed device can be realized easily.

This application claims the benefit of Japanese Application No. Hei. 10-17454 which is hereby incorporated by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A single shaft type table feed device comprising:
   a single feed screw shaft extending in an axial direction;
   a guide rail extending in parallel with said screw shaft;
   a moveable body movably supported by said guide rail and fed by said screw shaft in the axial direction; and
   an auxiliary moveable body distinct from said moveable body in the axial direction for supporting a table, said auxiliary movable body being movably supported by said guide rail in the axial direction and being moved in linking a movement of said table mounted on said moveable body.

2. The single shaft type table feed device according to claim 1, wherein said auxiliary movable body includes an inside diameter portion through which said feed screw shaft can be inserted, and the inside diameter portion of said auxiliary movable body is contactable with the said feed screw shaft.

3. The single shaft type table feed device according to claim 2, wherein the inside diameter portion of said auxiliary movable body is disengaged with said feed screw shaft in a normal operation, but is contactable with the feed screw shaft when said feed screw shaft is vibrated.

4. The single shaft type table feed device according to claim 2, wherein the inside diameter portion of said auxiliary movable body is slidably contacted with the said feed screw shaft.

5. The single shaft type table feed device according to claim 2, wherein said auxiliary movable body comprises:
   a sliding contact member brought in sliding contact with said feed screw shaft.

6. The single shaft type table feed device according to claim 5, wherein said sliding contact member is divided into a plurality of segments.

7. The single shaft type table feed device according to claim 6, wherein said sliding contact member are divided into a plurality of segments in a peripheral direction thereof, and said segments are assembled by an elastic body.

8. The single shaft type table feed device according to claim 5, wherein said auxiliary movable body further comprises:
   a main body portion movably supported by said guide rail, said main body portion being coupled with said sliding contact member through a fastening member.

9. The single shaft type table feed device according to claim 5, wherein said sliding contact member comprises a lubricant containing member.

10. The single shaft type table feed device according to claim 5, wherein said auxiliary movable body is brought in threadedly engagement with said feed screw shaft.

11. The single shaft type table feed device according to claim 2, wherein said auxiliary movable body comprises:
    a sliding contact member brought in sliding contact with said feed screw shaft and is formed in a cylindrical shape.

12. The single shaft type table feed device according to claim 11, wherein said auxiliary movable body further comprises:
    a main body portion movably supported by said guide rail, said main body portion being coupled with said sliding contact member through a fastening member.

13. The single shaft type table feed device according to claim 2, wherein said sliding contact member in the form of said cylindrical shape are divided into a plurality of segments.

14. The single shaft type table feed device according to claim 13, wherein said sliding contact member are divided into a plurality of segments in a peripheral direction thereof, and said segments are assembled by an elastic body.

15. The single shaft type table feed device according to claim 1, wherein the auxiliary moveable body is disposed apart from the moveable body in the axial direction.

16. The single shaft type table feed device according to claim 15, wherein the auxiliary body is disposed apart from the moveable body at a support distance in the axial direction according to a desired critical speed for said feed screw shaft.

* * * * *